(12) United States Patent
Johnson et al.

(10) Patent No.: US 9,201,809 B2
(45) Date of Patent: Dec. 1, 2015

(54) ACCIDENTAL SHARED VOLUME ERASURE PREVENTION

(71) Applicant: International Business Machines Corporation, Armonk, NY (US)

(72) Inventors: Gavin S. Johnson, San Jose, CA (US); Michael J. Koester, Hollister, CA (US); John R. Paveza, Morgan Hill, CA (US)

(73) Assignee: GlobalFoundries Inc.

( * ) Notice: Subject to any disclaimer, the term of this patent is extended or adjusted under 35 U.S.C. 154(b) by 253 days.

(21) Appl. No.: 13/894,291

(22) Filed: May 14, 2013

(65) Prior Publication Data

US 2014/0344535 A1  Nov. 20, 2014

(51) Int. Cl.
*G06F 12/00* (2006.01)
*G06F 13/00* (2006.01)
*G06F 12/12* (2006.01)

(52) U.S. Cl.
CPC .................... *G06F 12/121* (2013.01)

(58) Field of Classification Search
None
See application file for complete search history.

(56) References Cited

U.S. PATENT DOCUMENTS

| | | | |
|---|---|---|---|
| 6,247,099 B1 * | 6/2001 | Skazinski et al. | 711/141 |
| 6,343,324 B1 | 1/2002 | Hubis et al. | |
| 7,191,304 B1 * | 3/2007 | Cameron et al. | 711/202 |
| 2005/0071592 A1 * | 3/2005 | DeCaro | 711/163 |
| 2008/0065815 A1 | 3/2008 | Nasu et al. | |
| 2008/0177955 A1 * | 7/2008 | Su | 711/154 |
| 2011/0283077 A1 | 11/2011 | Cammarata et al. | |
| 2012/0246126 A1 | 9/2012 | Rodriguez et al. | |
| 2013/0018852 A1 | 1/2013 | Barton et al. | |
| 2013/0047032 A1 * | 2/2013 | Chauvet et al. | 714/15 |
| 2014/0344535 A1 * | 11/2014 | Johnson et al. | 711/159 |

FOREIGN PATENT DOCUMENTS

JP  2005031746 A  2/2005

OTHER PUBLICATIONS

Pipitone et al., "Two Phase File Deletion," IPCOM000104421D, Mar. 19, 2005, pp. 373-376.
International Search Report from PCT Application No. PCT/IB2014/059805, dated Dec. 14, 2014.

* cited by examiner

*Primary Examiner* — Sean D Rossiter
(74) *Attorney, Agent, or Firm* — Zilka-Kotab, PC

(57) ABSTRACT

Various embodiments of accidental shared volume erasure prevention include systems, methods, and/or computer program products for receiving a request to access a volume from a requesting system, determining whether the volume is associated with any system other than the requesting system, and preventing accidental erasure of the volume based on the determination.

16 Claims, 5 Drawing Sheets

ACCIDENTAL SHARED VOLUME ERASURE PREVENTION

BACKGROUND

The present invention relates to computer networking, and more specifically, this invention relates to management of volumes in a computer network architecture.

In any network architecture where some components may be simultaneously in use by other components, it is advantageous to provide means of managing the connections between the components so as to avoid breaking any connection under inappropriate circumstances.

For example, if a volume is in use by a plurality of systems of an architecture, it is advantageous to manage access to that volume such that any operation which would disrupt the operation of systems connected to the volume is prevented. In order to accomplish this feat, conventional systems query each system in the architecture to determine whether a device is grouped with the system (in the same path group) using the device's device address.

However, this conventional approach is time-consuming and burdensome. Each time an operation that might disrupt operation of one or more systems is received, this query procedure must be conducted, while holding off other requests that may be incoming while the query is being performed. At best, this slows architecture operation, and at worst can result in an overwhelming backlog of requests building up while the query procedure is repetitively performed, which may result in some requests being dropped or never processed/responded to.

Accordingly, it would be advantageous to provide systems, methods, and computer program products enabling rapid, computationally efficient determination of device associations in an architecture without relying on the conventional query procedure.

BRIEF SUMMARY

In one embodiment, a method includes receiving a request to access a volume from a requesting system. The method also includes determining whether the volume is associated with any system other than the requesting system, and preventing accidental erasure of the volume based on the determination In another embodiment, an apparatus includes a processor and logic integrated with and/or executable by the processor. The logic is adapted to receive a request to access a volume of an architecture from a requesting system of the architecture, determine whether the volume is associated with any system other than the requesting system and prevent accidental erasure of the volume based on the determination In still another embodiment, a computer program product for accidental shared volume erasure prevention includes a computer readable storage medium having program code embodied therewith. The program code is readable and/or executable by a controller. Further, the program code causes the controller to receive a request to access a volume from a requesting system, determine whether the volume is associated with any system other than the requesting system and prevent accidental erasure of the volume based on the determination.

Other aspects and embodiments of the present invention will become apparent from the following detailed description, which, when taken in conjunction with the drawings, illustrate by way of example the principles of the invention.

DETAILED DESCRIPTION

Figure 1:
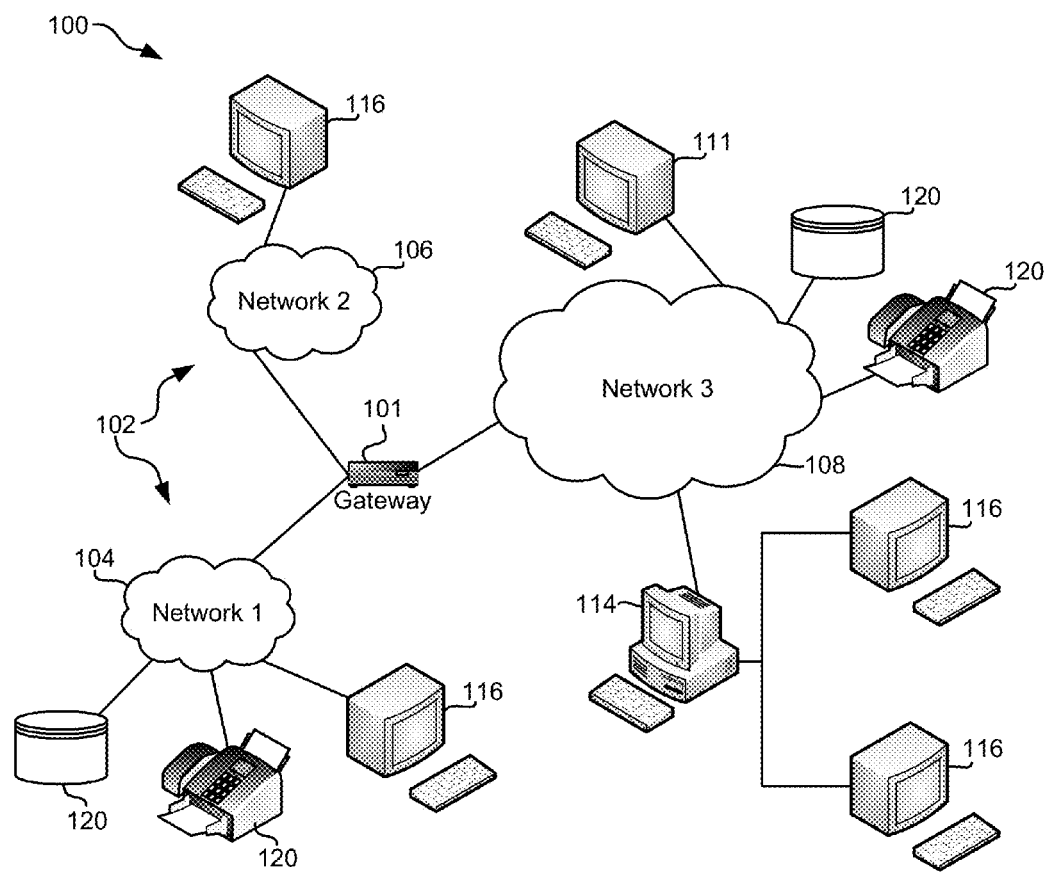
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

At a high level, the following description discloses several preferred embodiments of systems, methods and computer program products for managing access to volumes of a network architecture. Particularly, the storage controller has knowledge of which host systems have established connections to a set of volumes. That knowledge is utilized to reject un-recoverable I/O requests (such as Initialize Volume) and avoid data loss. For example, the storage controller may reject a channel program if the storage device is grouped (online) to any host system other than the host system seeking to connect to the storage device.

In one general embodiment, a method includes receiving a request to access a volume from a requesting system. The method also includes determining whether the volume is associated with any system other than the requesting system and preventing accidental erasure of the volume based on the determination In another general embodiment, an apparatus includes a processor and logic integrated with and/or executable by the processor. The logic is adapted to receive a request to access a volume of an architecture from a requesting system of the architecture, determine whether the volume is associated with any system other than the requesting system and prevent accidental erasure of the volume based on the determination.

In yet another general embodiment, a computer program product for accidental shared volume erasure prevention includes a computer readable storage medium having program code embodied therewith. The program code is readable and/or executable by a controller. Further, the program code causes the controller to receive a request to access a volume from a requesting system, determine whether the volume is associated with any system other than the requesting system and prevent accidental erasure of the volume based on the determination.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
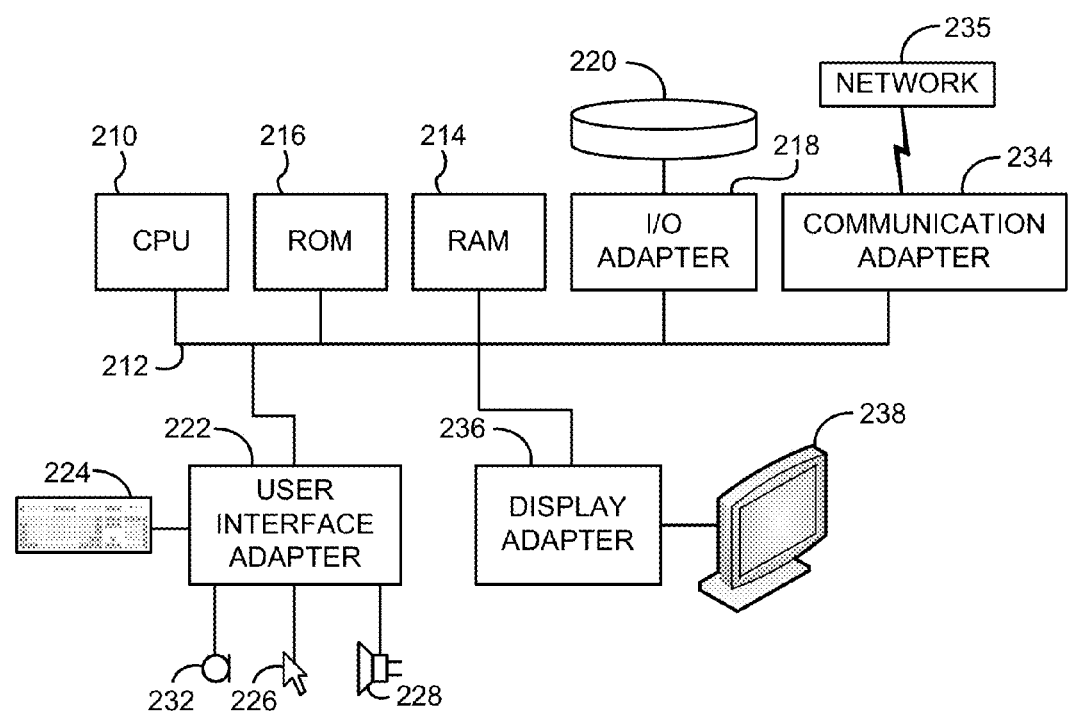
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
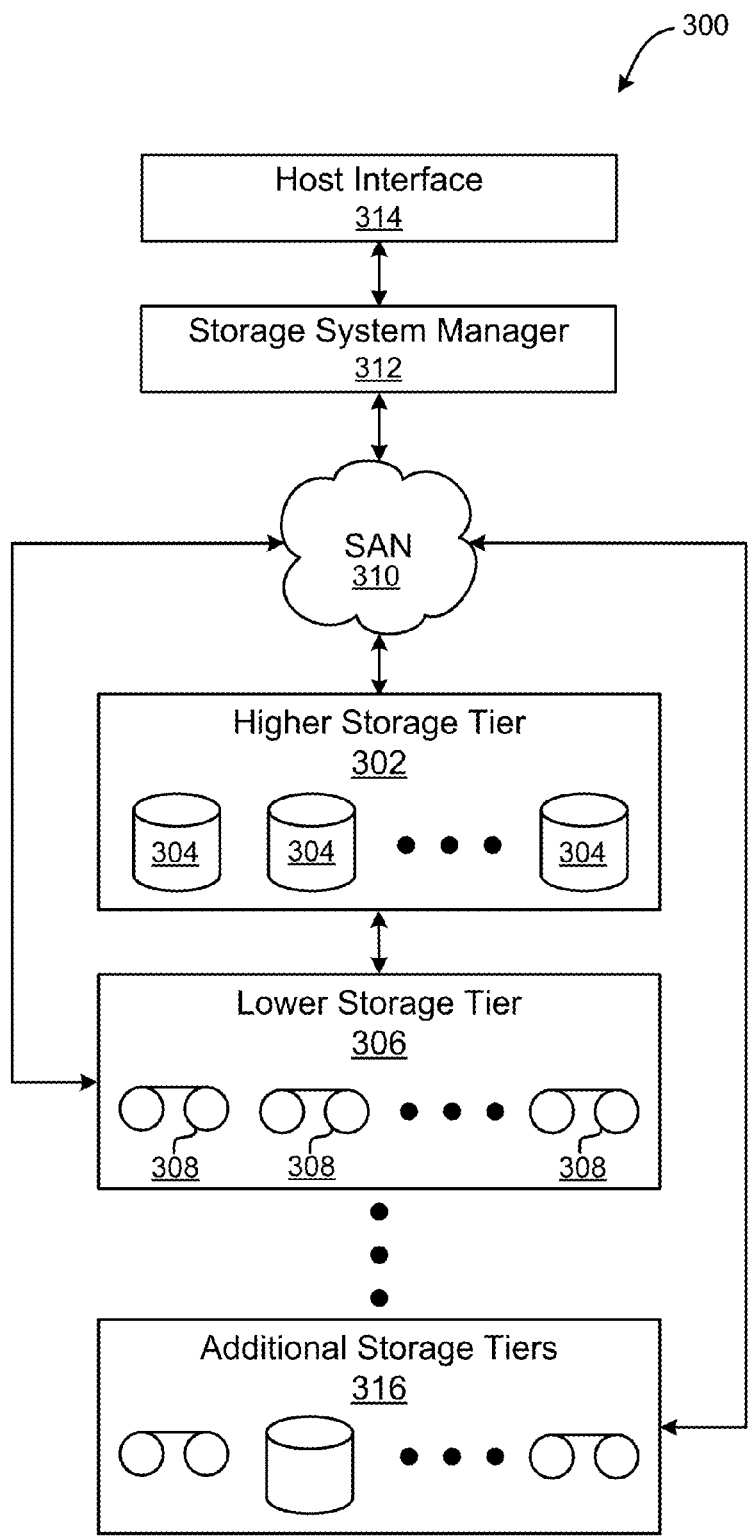
FIG. 3 depicts an exemplary tiered storage system, according to one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
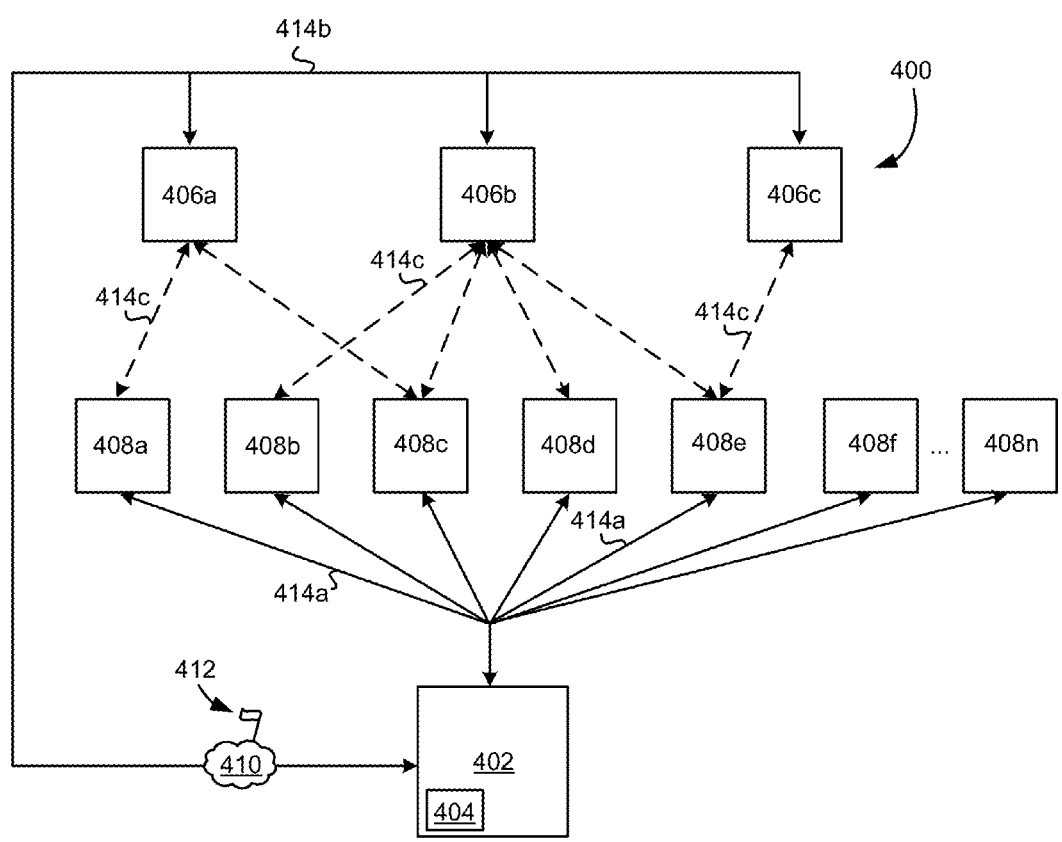
FIG. 4 depicts one embodiment of a network architecture adapted for performing accidental shared volume erase prevention.

Referring now to FIG. 4, a network architecture 400 is shown according to one embodiment. As shown in FIG. 4, the exemplary network architecture includes a disk controller 402 having a memory 404 and a processor (not shown), a plurality of systems 406a-406c, and a plurality of volumes 408a-408n. As will be appreciated by one having ordinary skill in the art upon reading the present descriptions, the controller 402, memory 404, systems 406a-406c and volumes may be any suitable type of controller, memory, system, and volume, respectively. Moreover, some or all of the components may be virtualized rather than using physical components, in various embodiments.

In one embodiment, multiple systems 406a-406c may be connected to the controller 402, and each system 406a-406c may be assigned a unique path group ID. The path group ID may be any suitable string, and in one preferred approach comprises the system CPU ID plus the system data clock value. Using this unique path group ID, the controller 402 may determine and maintain all the path groups within the architecture 400.

The components of the architecture, including the controller 402, systems 406a-406c, and/or volumes 408a-408n may be in communication via one or more connections 414a-414b, and one or more of the systems 406a-406c may be associated with one or more of the volumes 408a-408n, as indicated by dashed lines 414c. The connections may be any suitable type of connection, and may include physical connections such as Ethernet cables, fibre optic cables, etc., wireless connections such as those achievable using a wireless network, a cellular network, or any other form of wireless communication, and virtual connections such as between various virtual components of a network, including virtual switches, logical volumes, virtual local area networks (VLANs), etc. as would be understood by one having ordinary skill in the art upon reading the present descriptions.

In the particular embodiment shown in FIG. 4, the controller 402 is in communication with each of the volumes 408a-408n via a connection 414a. Moreover, the controller is in communication with each of the systems 406a-406c via a connection 414b. Preferably, the connection 414b is adapted for communicating requests between the systems 406a-406c and the controller 402. For example, and again as shown in FIG. 4, requests may be any suitable type of request, such as request 410, which is an input/output (I/O) request having associated therewith a flag 412.

In some approaches, the request 410 may be generated by software residing on and/or being executed by the requesting system. The software that generates the request 410 may also generate the flag 412 and associate the flag with the request 410. Preferably, the flag 412 is a "Fail-if-Grouped" (FIG) flag that instructs hardware to fail requests relating to device(s) associated with system(s) other than the system submitting the request. Accordingly, as will be understood by one having ordinary skill in the art upon reading the present descriptions, various hardware components of the architecture 400 may be adapted to recognize a FIG flag 412 and fail requests 410 having a FIG flag 412 associated therewith when the request relates to device(s) associated with system(s) other than the system submitting the request.

In some embodiments, the request may be received by the controller 402, and the controller 402 may perform one or more operations in response to receiving the request, such as described below with reference to method 500, depicted in FIG. 5. Of course, as would be appreciated by one having ordinary skill in the art upon reading the present descriptions, the request may be received by any component of an architecture, and any suitable action (or omission of action) may be taken in whole or in part in response to the request being received.

Referring again to FIG. 4, in a preferred embodiment the controller 402 is adapted to perform various functionalities, such as those described below. The following functionalities, while described in the context of being performed by the controller, are equally capable of being performed using any suitable component of a network architecture such as would be understood by a skilled artisan upon reading the present descriptions.

In one embodiment, a controller 402 may include a processor and logic integrated with and/or executable by the processor. The logic may be adapted to cause the controller to perform various operations. Exemplary operations include receiving a request to access a volume of an architecture from a requesting system of the architecture, determining whether the volume is associated with any system other than the requesting system, and preventing accidental erasure of the volume for the other system(s) associated with the volume based on the determination.

In one embodiment, the controller 402 may be further adapted to store hardware connection information regarding the various systems 406a-406c and/or volumes 408a-408n in the controller memory 404. As understood herein, hardware connection information may include any information about connections between physical or virtual components of an architecture. In one particular embodiment, the hardware connection information stored in the controller memory 404 includes a volume identifier for each of a plurality of volumes 408a-408n of a network architecture. Hardware connection information also includes a system identifier for each of a plurality of systems 406a-406c of the network architecture. Finally, in this embodiment hardware connection includes one or more association records for each of the volumes 408a-408n associated with at least one of the systems 406a-406c. In some embodiments, the hardware connection information is maintained solely within the controller 402, and is not distributed to any other component of the architecture 400.

In other words, each volume associated with a system has an association record memorializing the association between that volume and that particular system (such as the association between system 406c and volume 408e, as illustrated in FIG. 4 via association 414c). As will be appreciated by one having ordinary skill in the art upon reading the present descriptions, each volume 408a-408n may therefore have a plurality of corresponding association records in the stored hardware connection information, each association record providing hardware connection information for a single volume-system association. Similarly, volumes not associated with any system 406a-406c (such as volume 408f as shown in FIG. 4) will not have any corresponding association record in the stored hardware connection information, in one approach However, in other approaches it is equally feasible to retain an association record for each possible system-volume pair in the architecture, and merely modify the association indicator in each record to reflect whether the possible pairing indeed exists as an active association. However, maintaining an association record for each potential permutation of volume-system associations is not a preferred approach because doing so requires greater memory to store the hardware connection information as well as more computational resources to determine whether any given volume is associated with any particular system (or generally associated with any system, without regard to the system identity).

Moreover still, in one embodiment each association record may include three components. Exemplary components include a volume identifier for a volume associated with a particular system, the system identifier for the particular system with which the volume is associated, and an association indicator, e.g. a flag, binary toggle, string, etc. as would be understood by one having ordinary skill in the art upon reading the present descriptions). Of course, the association records may include more or less components than those described above, as well as different components, in various combinations. Accordingly, the hardware configuration information may comprise a database, table, or any other organizational structure suitable for use in conjunction with a plurality of association records memorializing the topology of system-volume associations throughout the architecture 400, in one embodiment.

The presently disclosed systems and techniques advantageously enable atomic solutions for determining querying system-volume associations and/or accessibility. As understood herein, "atomic" solutions are those that do not require querying individual volumes and/or systems for association information. In this manner, various embodiments of the presently disclosed Accidental Shared Volume Erasure Prevention (ASVEP) systems, techniques, etc. may quickly and efficiently determine hardware connection information without querying individual devices in a network architecture. Rather, all hardware connection information may be maintained by software, stored in and/or made accessible to a disk controller, and utilized by the disk controller to prevent accidental shared volume erasure in any suitable manner understood by one having ordinary skill in the art upon reading the present descriptions. In one embodiment, maintaining the hardware connection information may include maintaining path group in formation for the various components of the architecture setting forth the various components to which each component is connected via the architecture (and preferably via the controller 402).

Hardware connection information, and in particular association records as described above, confer advantageous atomic speed and efficiency to the architecture 400 regarding determination of whether various components are online to other components in the architecture 400. This atomic technique enables determination of the associations in the architecture 400 without needing to query any of those components regarding the associations established with other architecture components and the identity of the components associated with one another. Rather, as disclosed herein atomic shared volume erasure prevention systems and techniques perform query-free (atomic) determination of system-volume associations using the hardware configuration information.

In one particular embodiment, the controller may be adapted to retrieve the hardware connection information from the memory. The controller may also be adapted to determine whether the volume is associated with any system other than the requesting system using the retrieved hardware connection information. The controller may perform these operations in response to reading and/or executing computer readable program code, in some approaches.

In more approaches, determining whether the volume is associated with any system other than the requesting system using the retrieved hardware connection information may include identifying whether the volume identifier of the volume to which access is requested exists in any association record. Upon determining the volume identifier exists in an association record, determining whether the volume is associated with a system other than the requesting system includes determining whether the corresponding association record indicates an active (i.e. "online") association exists between the volume and the other system. If the volume identifier exists in an association record, and the association indicator indicates that the association is active, then it may be determined that the volume is associated with at least one system other than the requesting system, and access to the volume by the requesting system may be denied.

In various approaches identifying whether the volume identifier of the volume to which the access is requested exists in the association record may include performing a simple search of the hardware configuration information, such as a simple lookup operation. This atomic approach enables much quicker determination of potential I/O conflicts than submitting queries to each volume requesting an indication of the system(s) with which the volume is associated, and receiving a response from the volume(s) indicating the system(s) with which the volume is associated, as conventionally performed to determine system-volume associations.

In still further approaches, it may be advantageous to periodically update the hardware connection information in order to ensure that the information contained therein is the most accurate representation of the actual connections existing between various components of the architecture 400 at any given point in time. To this effect, one or more components, such as the controller 402, may be further configured to include and/or execute logic. The logic may be adapted to determine whether each of one or more volumes of the architecture is associated with one or more systems of the architecture and update the hardware connection information based on any determined associations.

In one approach, updating hardware connection information may include updating one or more association records to include the system identifier and path group identifier associated with the system for which an association was determined to exist. Preferably, updating the hardware connection information is an operation that the controller manages dynamically.

For example, the logic adapted to update the hardware connection information may itself include logic more specifically adapted to perform additional functions, such as creating one or more new association records for associations determined to currently exist but which were not previously recorded in the hardware connection information. Other additional functions include modifying one or more existing association records (e.g. to modify a volume identifier, system identifier, or association indicator, etc.) and/or deleting one or more existing association records.

Modifying existing association records may include changing an association record to reflect that a volume has changed the system(s) with which it is associated by substituting the system identifier for the system with which the volume was previously associated with the system identifier for the system with which the volume is now associated. Similarly, association records may be modified to change the volume identifier and accordingly update hardware connection information to reflect the most recent state of connections in the architecture While in some approaches it may be desirable to maintain association records even after an association between a particular volume and system is terminated, in other approaches deleting invalid association records reduces the computational cost of preventing accidental shared volume erasure as described herein.

For example, in one instance a volume is associated with a particular system. The volume experiences a fatal error, causing mechanical failure of the volume. Accordingly, the volume is removed from the architecture. As will be appreciated by one having ordinary skill in the art upon reading the present descriptions, there is no benefit to retaining the association record(s) for the removed volume. The presently disclosed embodiments therefore include the capability to delete association records from the hardware connection information.

Figure 5:
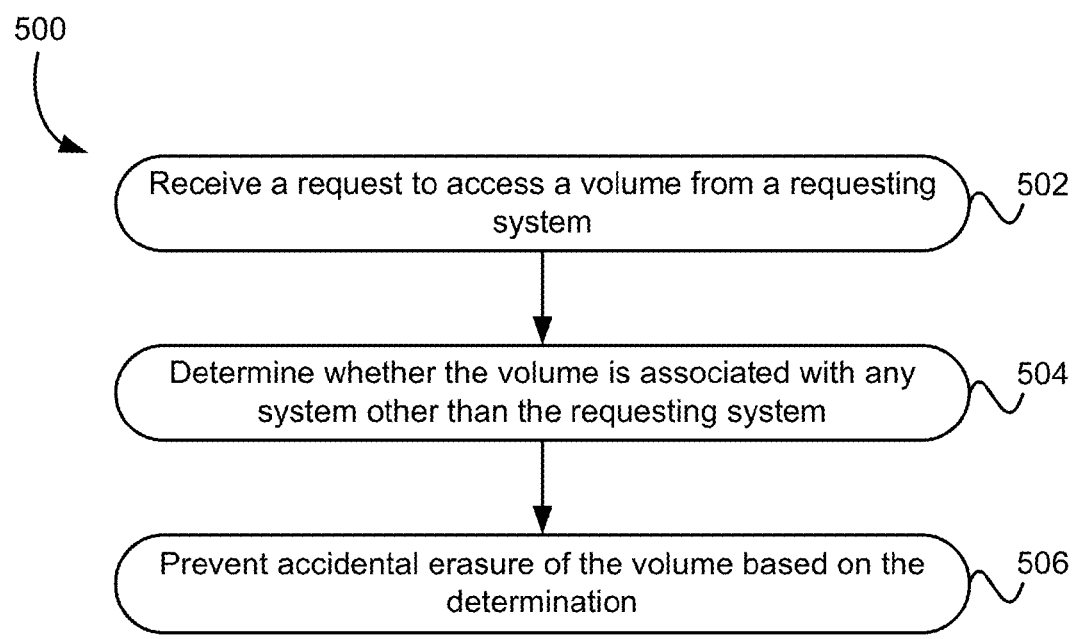
FIG. 5 is a flowchart of a method, according to one embodiment.

Referring now to FIG. 5, a flowchart of a method 500 is shown, according to one embodiment. The method 500 may be performed in any environment, including those depicted in FIGS. 1-4, among others. Moreover, the method 500 may be performed in any order of operations, and may include any combination of additional operations disclosed herein. Operations of the method 500 may be repeated, in some approaches.

In operation 502 of method 500, a request to access a volume is received from a requesting system. The request may be received via any suitable manner known in the art, and in one embodiment is received by a disk controller such as controller 402 shown in FIG. 4.

In operation 504, any associations between the volume and any system other than the requesting system are determined. In a preferred approach, a volume is "associated" with a system when it is "online" to that system. A volume being "online" to a system includes any state of system-volume interaction where performing an operation on that volume would cause another system to which the volume is "online" to be disrupted (e.g. by losing connection to the volume). Viewed another way, from the perspective of hardware components in the architecture 400, two components are "online" if they are part of the same path group, i.e. they are grouped to the same path.

Disruptive operations may generally be considered to include any type of operation where the content of the volume may be changed, as well as any operation that may change any content that is common to a system other than the requesting system, the other system having access to the shared volume.

Exemplary operations that would disrupt a system to which a volume is online include volume initialization, changing a volume serial, changing a volume table of contents (VTOC) location, changing a volume catalog such as a virtual storage access method (VSAM) volume data set (VVDS), etc. as would be understood by one having ordinary skill in the art upon reading the present descriptions.

In some approaches, determining whether the volume is associated with any system other than the requesting system may include determining hardware connection information for the volume. Using the hardware connection information, it is possible to determine whether the volume is in active communication with, or is online to, any of the other systems.

The hardware connection information, in one embodiment, may be determined at least in part using a simple search, such as a lookup. For example, in one embodiment the hardware connection information may be determined by performing a lookup query using an identifier associated with the volume. The lookup query may identify a record in a database, table, text file, etc. and hardware connection information contained in the record may be reviewed.

In operation 506, accidental erasure of the shared volume is prevented for any of the other system(s) to which the volume is already associated. The accidental erasure is prevented based on the determination of whether the volume is associated with any system other than the requesting system. In one particular approach, the preventing performed in operation 506 may include denying the requesting system access to the volume. Access is denied in response to determining the volume is associated with a system other than the requesting system. Conversely, access is granted upon determining the volume is not associated with any system other than the requesting system.

In some approaches, denying the requesting system access to the volume may include rejecting the request via sense information such as a sense code. As understood herein, sense code provides command information on why a command rejected a request and the reason for rejecting the request. The sense code may be issued for any number of reasons, for example when the a request is a wormed request, when there is an independent problem with the controller, when the path group or connection link is damaged, etc. as would be understood by one having ordinary skill in the art upon reading the present descriptions.

In a general approach, issuing sense code may include performing unit check where the controller is determines the request was not successful and accordingly raises a unique status that indicates the request failed. This status information is communicated to the system. When the system receives the receive status information, the system may responsively request sense data to provide further context for the refusal. In response to receiving the request for the sense data, in one approach the controller may return 32 bytes of sense information, which the system may decode to glean from the sense data the fact that the request was failed, and the reasons for failing the request. In one embodiment sense data comprises 32 bytes of information that describe what the error is and its context.

In even more approaches commensurate in scope with the present descriptions, the method 500 may include any number of additional and/or alternative operations, such as will be described below.

In one embodiment, method 500 may additionally and/or alternatively include issuing a sense code to the requesting system in response to determining the volume is associated with any system other than the requesting system. Preferably, the sense code rejects the request.

In another embodiment, method 500 may additionally and/or alternatively include determining whether the request has associated therewith a flag (such as flag 412), which is preferably a "Fail If Grouped" (FIG) flag that instructs the architecture 400 (and preferably the controller 402) to refuse (fail) the request if the volume to which the request applies is already associated with another system besides the requesting system.

In some embodiments, the hardware connection information may be determined only in response to receiving the request and determining that the request has associated therewith a FIG flag. In this manner, the presently described systems, methods and computer program products may perform accidental shared volume erasure only when requested. It may be advantageous, in some embodiments, to permit a requesting system access to a volume regardless of whether the volume is in communication with a system other than the requesting system.

For example, in one approach a request pertains to a high-priority process such as network security functions, a critical processing job, backup operation, or any other essential processing operation or network function that would be understood by one having ordinary skill in the art upon reading the present descriptions. It may be unacceptable to permit the request to be denied. Such high-priority requests may be exempted from denial by omitting any FIG flag, and accordingly preventing the determination of whether the volume is associated with any other systems.

Alternatively and/or additionally, since performing the determination of association(s) between volumes and systems utilizes compute resources, it may be advantageous to avoid performing accidental shared volume erasure prevention for every single incoming request. Accordingly, a user may predetermine one or more requests and/or request types that should or should not be subjected to accidental shared volume erasure prevention. Those requests and/or request types designated as meriting accidental shared volume erasure prevention may have associated therewith a FIG flag, while other requests may not.

A user may also define an ASVEP policy, which may include instructions, parameters, and/or conditions, etc. that may be utilized to determine whether incoming requests should be subjected to ASVEP. For example, requests may be subjected to ASVEP based on one or more of: request origin (e.g. identity of the requesting system, the path group of the requesting system, the path by which the request was received, etc.), the identity of the volume to which access is being requested, the time of day when the request is received (e.g. normal business hours, off-peak hours, etc.), the date upon which the request is received (e.g. weekday, weekend day, holiday), etc. as would be understood by one having ordinary skill in the art upon reading the present descriptions.

An exemplary use case scenario will now be described. It will be appreciated that the exemplary use case is in no way limiting upon the scope of the present disclosures, and is provided merely to illustrate one potential implementation of the inventive concepts described herein.

Referring to FIGS. 4 and 5, a system such as system 406*b* would like to connect to a volume of an architecture 400 to perform a potentially disruptive operation. The system generates a request for access to the volume, for example volume 408*f*, associates a FIG flag 412 with the request, and sends the request to a disk controller 402, for example along a connection 414*b*. The disk controller receives the request 410 (as in operation 502), and in response to receiving the request 410 and recognizing the FIG flag 412, retrieves hardware connection information from memory 404. Moreover, since the request had associated therewith a FIG flag 412, upon recognizing the FIG flag 412, the disk controller 402 interpreted therefrom instructions to fail the request 410 if the volume to which access was requested is associated with any system other than the requesting system.

The disk controller consults the hardware connection information to determine if volume 408*f* is associated with any system other than the requesting system, i.e. whether volume 408*f* is associated with either system 406*a* or 406*c*. The disk controller 402 may do so by checking the hardware connection information to see if there is any association record indicating that volume 408*f* is associated with either of system 406*a* or 406*c*. According to the schematic in FIG. 4, volume 408*f* is not associated with any system (as indicated by no associations 414*c* existing between any system 406*a*-406*c* and volume 408*f*). Therefore, (assuming the hardware connection information is up-to-date) no association record will indicate an association exists between volume 408*f* and any system other than the requesting system. The disk controller thus determines that volume 408*f* is not associated with any system other than the requesting system, as in operation 504. Accordingly, the disk controller 402 may permit system 406*b* access to volume 408*f* without causing any accidental shared volume erasure, thereby having prevented any accidental shared volume erasure, as in operation 506.

Conversely, assume system 406*b* had requested access to volume 408*c* to perform a potentially disruptive operation. In this scenario, the disk controller, upon receiving the corresponding request 410 and retrieving the hardware connection information from memory 404 in response to receiving the request 410 and recognizing the FIG flag 412, the disk controller locates an association record memorializing the existence of an association between volume 408*c* and system 406*a*. As a result, disk controller 402 determines that volume 408*c* is associated with system 406*a*, a system other than the requesting system 406*b*. The disk controller 402 denies system 406*b* access to volume 408*c*, because allowing access in this instance may result in accidental erasure of the shared volume 408*c* with respect to system 406*a*. Since the FIG flag 412 instructed the controller to fail any requests that may result in accidental shared volume erasure, the controller refuses access to system 406*b*, thereby preventing accidental shared volume erasure.

Those having ordinary skill in the art will appreciate, based on the foregoing exemplary use cases, the various outcomes of requests that may be hypothetically issued from any architecture arrangement, such as requests from any of systems 406*a*, 406*b* or 406*c* for access to any of volumes 408*a*-408*n* according to the scenario shown in FIG. 4, or any equivalent thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

As mentioned above, the presently disclosed concepts may be embodied in a computer program product for accidental shared volume erasure prevention. The computer program product may include, for example, a computer readable storage medium having program code embodied therewith, the program code readable/executable by a device such as a processor (e.g. a processor of the controller 402) to cause the device to perform any functionality described herein, in various approaches.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of preventing accidental data erasure in a network architecture, the method comprising:
receiving a request to access a volume from a requesting system;
determining whether the volume is associated with any system other than the requesting system; and
preventing accidental erasure of the volume based on the determination,
wherein the request is an input/output (I/O) request built by software,
wherein the request includes a fail if grouped (FIG) flag,
wherein each of the determining and the preventing are performed in response to detecting the FIG flag, and
wherein the preventing comprises rejecting the I/O request with sense code.

2. The method as recited in claim 1, wherein the preventing comprises:
denying the requesting system access to the volume in response to determining the volume is associated with any system other than the requesting system; and
allowing the requesting system access to the volume in response to determining the volume is not associated with any system other than the requesting system, and
wherein the denying further comprises sending a message to the requesting system,
wherein the message indicates the request is denied because the volume is associated with a system other than the requesting system.

3. The method as recited in claim 1, further comprising assigning at least one unique path group ID to each system of the network architecture.

4. The method as recited in claim 1, wherein the determining further comprises:
determining hardware connection information for the volume; and
determining whether the volume is in active communication with any of the other systems based on the hardware connection information,
wherein the hardware connection information is determined at least in part using a lookup.

5. The method as recited in claim 1, further comprising allowing the requesting system access to the volume in response to determining the request is not associated with the flag.

6. An apparatus, comprising:
a processor and logic integrated with and/or executable by the processor, the logic being configured to:
receive a request to access a volume of an architecture from a requesting system of the architecture;
determine whether the volume is associated with any system other than the requesting system; and
prevent accidental erasure of the volume based on the determination,
wherein the request is an input/output (I/O) request,
wherein the request includes a fail if grouped (FIG) flag, and
wherein each of the determining and the preventing are performed in response to detecting the FIG flag.

7. The apparatus as recited in claim 6, further comprising a memory having stored thereon hardware connection information.

8. The apparatus as recited in claim 7, the hardware connection information comprising:
a volume identifier for each of a plurality of volumes of a network architecture;
a system identifier for each of a plurality of systems of the network architecture; and
at least one association record for each of the volumes that is associated with at least one of the systems.

9. The apparatus as recited in claim 8, wherein each association record comprises: the volume identifier for a volume associated with a particular system;
the system identifier for the particular system; and
an association indicator.

10. The apparatus as recited in claim 8, wherein the logic configured to determine whether the volume is associated with any system other than the requesting system further comprises logic configured to:
retrieve the hardware connection information from the memory; and
determine whether the volume is associated with any system other than the requesting system using the retrieved hardware connection information.

11. The apparatus as recited in claim 8, further comprising logic configured to:
determine whether each of one or more volumes of the architecture is associated with one or more systems of the architecture; and
update the hardware connection information based on determining one or more of the volumes of the architecture are associated with one or more of the systems of the architecture,
wherein the logic configured to update the hardware connection information comprises logic configured to:
create one or more new association records;
modify one or more existing association records; and
delete one or more existing association records.

12. The apparatus as recited in claim 6, wherein the logic configured to prevent accidental erasure of the volume is configured to prevent the accidental erasure further based on one or more of:
a request origin,
an identity of the volume to which access is requested,
a time of day when the request was received, and
a date upon which the request was received.

13. A computer program product for accidental shared volume erasure prevention, the computer program product comprising a computer readable storage medium having program code embodied therewith, the program code readable/executable by a controller to:
receive a request to access a volume from a requesting system;
determine whether the volume is associated with any system other than the requesting system;
prevent accidental erasure of the volume based on the determination;
deny the requesting system access to the volume in response to determining the volume is associated with any system other than the requesting system; and
allow the requesting system access to the volume in response to determining the volume is not associated with any system other than the requesting system,
wherein the request is a z/OS input/output (I/O) request,
wherein the request includes a fail if grouped (FIG) flag, and
wherein each of the determining and the preventing are performed in response to detecting the FIG flag,
wherein the denying further comprises sending a message to the requesting system, and wherein the message indicates the request is denied because the volume is associated with a system other than the requesting system.

14. The computer program product as recited claim 13, further comprising program code readable/executable by the controller to:
   determine whether each of one or more volumes is associated with one or more systems; and
   update hardware connection information based on determining one or more of the volumes are associated with one or more of the systems of the architecture.

15. The computer program product as recited claim 13, further comprising program code readable/executable by the controller to:
   retrieve hardware connection information from a memory of the controller;
   determine whether the volume is associated with any system other than the requesting system using the retrieved hardware connection information, and
   issue a sense code to the requesting system, the sense code rejecting the request, and
   wherein the sense code is issued in response to determining the volume is associated with any system other than the requesting system.

16. The computer program product as recited claim 13, further comprising program code readable/executable by the controller to issue a sense code to the requesting system, the sense code rejecting the request, wherein the sense code is issued in response to determining one or more of:
   the request is a wormed request,
   an independent problem exists with the controller,
   a path group corresponding to the volume is damaged; and
   a connection link corresponding to the volume is damaged.

* * * * *